(12) United States Patent
Nuggehalli et al.

(10) Patent No.: US 10,499,411 B2
(45) Date of Patent: Dec. 3, 2019

(54) METHOD AND APPARATUS FOR DATA TRANSMISSION ENHANCEMENTS IN MOBILE COMMUNICATIONS

(71) Applicant: MediaTek Inc., Hsinchu (TW)

(72) Inventors: Pavan Santhana Krishna Nuggehalli, San Jose, CA (US); Chia-Chun Hsu, Hsinchu (TW); Ming-Yuan Cheng, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 78 days.

(21) Appl. No.: 15/801,475

(22) Filed: Nov. 2, 2017

(65) Prior Publication Data

US 2018/0132263 A1 May 10, 2018

Related U.S. Application Data

(60) Provisional application No. 62/417,382, filed on Nov. 4, 2016.

(51) Int. Cl.
*H04W 72/12* (2009.01)
*H04L 1/18* (2006.01)
(Continued)

(52) U.S. Cl.
CPC ....... *H04W 72/1242* (2013.01); *H04L 1/1664* (2013.01); *H04L 1/1854* (2013.01);
(Continued)

(58) Field of Classification Search
CPC ............. H04W 72/1242; H04W 72/10; H04W 72/1247; H04W 76/27; H04L 1/1664; H04L 1/1854; H04L 1/1864
See application file for complete search history.

(56) References Cited

U.S. PATENT DOCUMENTS

2006/0133281 A1* 6/2006 Witherell .............. H04L 1/1854
370/238
2007/0091810 A1* 4/2007 Kim ...................... H04L 1/1635
370/236
(Continued)

FOREIGN PATENT DOCUMENTS

CN 101150496 A 3/2008
CN 102271364 A 12/2011
(Continued)

OTHER PUBLICATIONS

Taiwan Intellectual Property Office, Office Action for Taiwan Patent Application No. 106138096, dated Sep. 20, 2018.
(Continued)

*Primary Examiner* — Afsar M Qureshi
(74) *Attorney, Agent, or Firm* — Han IP PLLC; Andy M. Han

(57) ABSTRACT

Various solutions for data transmission enhancements with respect to user equipment (UE) and network apparatus in mobile communications are described. As a transmitter, a UE may determine whether specific information is comprised in a protocol data unit (PDU). The UE may mark the PDU in an event that the specific information is comprised in the PDU. The UE may further prioritize the marked PDU and deliver the marked PDU to a next protocol layer. As a receiver, a UE may receive a marked PDU comprising the specific information. The UE may deliver the marked PDU to a higher protocol layer out-of-order.

16 Claims, 5 Drawing Sheets

CONTENTS OF PDCP TRANSMISSION BUFFER BEFORE A TCP ACK PACKET ARRIVES

CONTENTS OF PDCP TRANSMISSION BUFFER AFTER A TCP ACK PACKET ARRIVES

(51) Int. Cl.
  *H04W 72/10* (2009.01)
  *H04L 1/16* (2006.01)
  *H04W 76/27* (2018.01)

(52) U.S. Cl.
  CPC ....... *H04W 72/10* (2013.01); *H04W 72/1247* (2013.01); *H04L 1/1864* (2013.01); *H04W 76/27* (2018.02)

(56) References Cited

U.S. PATENT DOCUMENTS

| | | | | |
|---|---|---|---|---|
| 2008/0310452 | A1* | 12/2008 | Vedantham | H04W 28/06 370/474 |
| 2013/0324142 | A1* | 12/2013 | Kanamarlapudi | H04W 72/10 455/452.1 |
| 2014/0050095 | A1* | 2/2014 | Szilagyi | H04L 1/0002 370/236 |
| 2016/0205164 | A1* | 7/2016 | Schmidt | H04L 1/0001 709/219 |
| 2016/0255632 | A1* | 9/2016 | Forssell | H04W 76/15 370/329 |
| 2017/0290005 | A1* | 10/2017 | Lin | H04L 69/16 |
| 2018/0199229 | A1* | 7/2018 | Lee | H04W 76/00 |

FOREIGN PATENT DOCUMENTS

| | | | |
|---|---|---|---|
| CN | 103763314 A | * | 4/2014 |
| CN | 1037663314 | * | 4/2014 |
| TW | 201424434 A | | 6/2014 |

OTHER PUBLICATIONS

State Intellectual Property Office, International Search Report and Written Opinion for PCT Application No. PCT/CN2017/109278, dated Jan. 26, 2018.

* cited by examiner

METHOD AND APPARATUS FOR DATA TRANSMISSION ENHANCEMENTS IN MOBILE COMMUNICATIONS

CROSS REFERENCE TO RELATED PATENT APPLICATION

The present disclosure claims the priority benefit of U.S. Provisional Patent Application No. 62/417,382, filed on 4 Nov. 2016, the content of which is incorporated by reference in its entirety.

TECHNICAL FIELD

The present disclosure is generally related to mobile communications and, more particularly, to data transmission enhancements with respect to user equipment and network apparatus in mobile communications.

BACKGROUND

Unless otherwise indicated herein, approaches described in this section are not prior art to the claims listed below and are not admitted as prior art by inclusion in this section.

There are various well-developed and well-defined cellular communications technologies in telecommunications that enable wireless communications using mobile terminals, or user equipment (UE). For example, the Global System for Mobile communications (GSM) is a well-defined and commonly used communications system, which uses time division multiple access (TDMA) technology, which is a multiplex access scheme for digital radio, to send voice, video, data, and signaling information (such as a dialed telephone number) between mobile phones and cell sites. The CDMA2000 is a hybrid mobile communications 2.5G/3G (generation) technology standard that uses code division multiple access (CDMA) technology. The UMTS (Universal Mobile Telecommunications System) is a 3G mobile communications system, which provides an enhanced range of multimedia services over the GSM system. The Long-Term Evolution (LTE), as well as its derivatives such as LTE-Advanced and LTE-Advanced Pro, is a standard for high-speed wireless communication for mobile phones and data terminals.

For data transmission in mobile communications, transmission control protocol (TCP) is the predominant transport layer protocol. The performance of TCP packet transmission may depend on various system parameters. For example, one dominant parameter is the round-trip transmit time (RTT). The TCP transmission throughput is inversely proportional to the RTT. An intuitive way to increase the TCP transmission throughput is to reduce the TCP RTT. A good mechanism to improve TCP RTT is to reduce the delay of TCP acknowledgement (ACK) in both the transmitter and the receiver endpoints. However, the protocol architecture in LTE is not beneficial for reducing TCP ACK delay and tends to be proprietary in nature and does not appear to scale well for high data rates communication systems. This issue will become more serious and need to be overcame for the newly developed New Radio (NR) or 5th Generation (5G) communication system supposed to support high data rates transmission.

Accordingly, it is important to properly reduce TCP RTT to boost TCP transmission throughput for high data rates transmission. Therefore, in developing future communication system, it is needed to provide proper mechanism for improving packet transmission between the transmitters and the receivers.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to data transmission enhancements with respect to user equipment and network apparatus in mobile communications.

In one aspect, a method may involve an apparatus determining whether specific information is comprised in a protocol data unit (PDU). The method may also involve the apparatus marking the PDU in an event that the specific information is comprised in the PDU. The method may further involve the apparatus prioritizing the marked PDU and delivering the marked PDU to a next protocol layer.

In another aspect, a method may involve an apparatus receiving a marked protocol data unit (PDU). The method may also involve the apparatus delivering the marked PDU to a higher protocol layer out-of-order. The marked PDU comprises specific information.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to data transmission enhancements with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

In data transmission, transmission control protocol (TCP) is the predominant transport layer protocol. The performance of TCP packet transmission may depend on various system parameters in a complex fashion. For example, the TCP transmission throughput can be modeled by a well-known Mathis equation as $$\frac{C \times MSS}{RTT \times \sqrt{p}},$$

where C is a constant, MSS is the maximum segment size, RTT is the TCP layer round-trip transmit time (RTT) and p is the packet loss probability. Since the TCP is a self-clocking protocol, the TCP transmission throughput is inversely proportional to the RTT.

An intuitive way to increase the TCP transmission throughput is to reduce the TCP RTT. A good mechanism to improve TCP RTT is to reduce the delay of TCP acknowledgement (ACK) in both the transmitter and the receiver endpoints. However, in Long-Term Evolution (LTE), such mechanism tends to be proprietary in nature and does not appear to scale well with respect to the high data rates that New Radio (NR) or 5th Generation (5G) communication system is supposed to support. The challenges in implementing TCP ACK prioritization with the LTE architecture in both the transmitter and the receiver will be described in the following descriptions.

Figure 1:
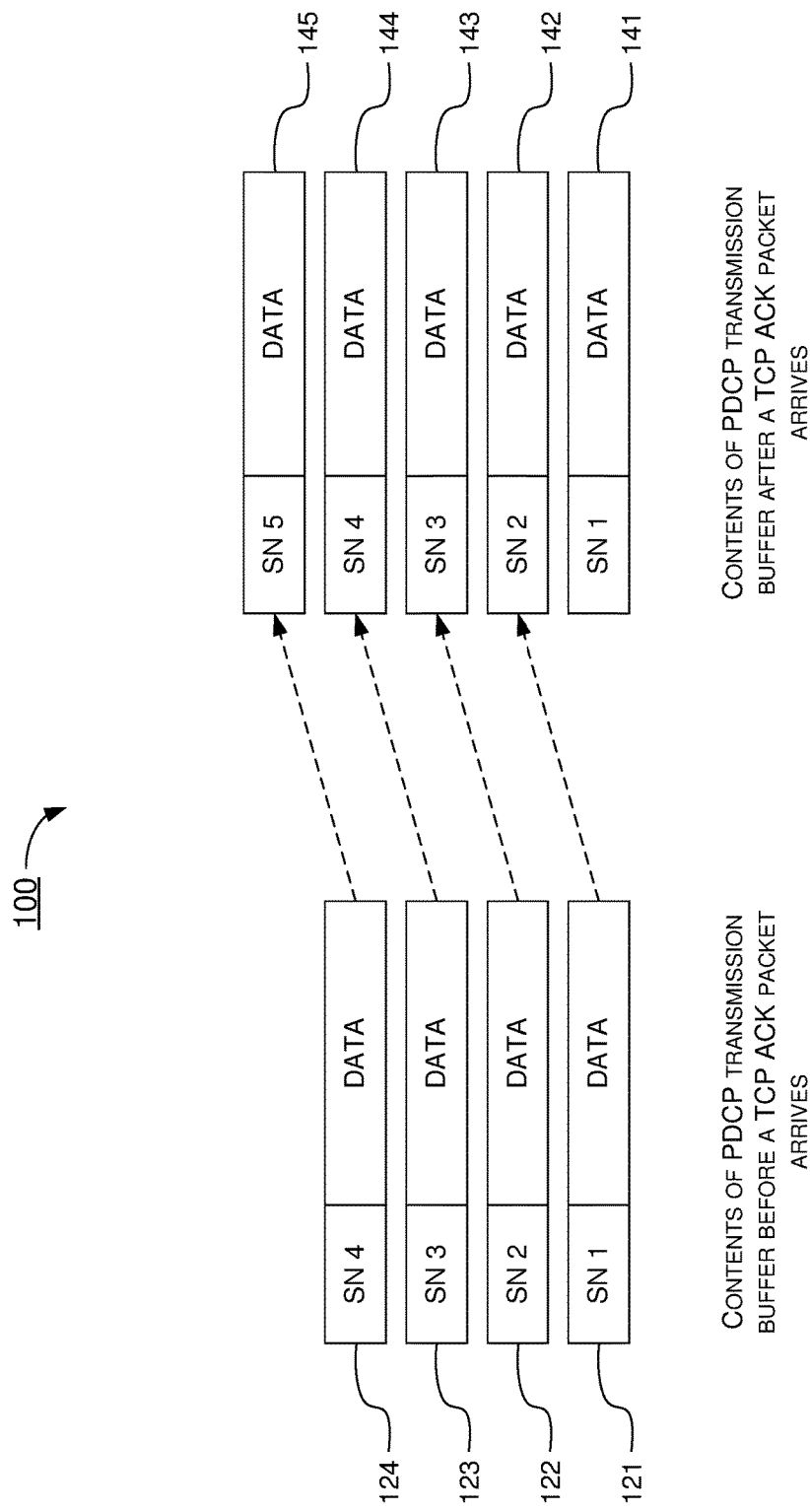
FIG. 1 is a diagram depicting an example scenario under schemes in accordance with implementations of LTE communication systems.

FIG. 1 illustrates an example scenario 100 under schemes in accordance with implementations of LTE communication systems. Scenario 100 involves a user equipment (UE) and a network apparatus, which may be a part of a wireless network (e.g., a LTE network, a LTE-Advanced network, a LTE-Advanced Pro network). For uplink transmission, the UE is the transmitter and the network apparatus is the receiver. For downlink transmission, the network apparatus is the transmitter and the UE is the receiver. FIG. 1 illustrates the packet data convergence protocol (PDCP) architecture in LTE. At the transmitter side, the PDCP entity may be configured to maintain a transmission buffer for buffering PDCP protocol data units (PDUs) need to be transmitted. When new data packets come, the PDCP entity may be configured to construct a PDCP PDU by numbering and encrypting the data packets and queue the constructed PDCP PDU into the buffer. Each PDCP PDU may comprise a header and a data portion. The header may indicate a sequence number (SN) of the PDCP PDU. As showed in left side of FIG. 1, the PDCP transmission buffer may comprise 4 PDCP PDUs 121-124 with the SN from SN 1 to SN 4. The first constructed PDCP PDU 121 is assigned with the oldest SN (e.g., SN 1). The last constructed PDCP PDU 124 is assigned with the newest SN (e.g., SN 4).

In order to prioritize the transmission of TCP ACK, the UE may be configured to insert the PDCP PDU containing the TCP ACK at the head of line in the PDCP transmission buffer and assign the oldest PDCP SN to the PDCP PDU containing the TCP ACK. For example, as showed in right side of FIG. 1, PDCP PDU 141 is the PDCP PDU containing the TCP ACK. The UE is configured to assign the oldest PDCP SN (e.g., SN 1) to the PDCP PDU 141 and insert PDCP PDU 141 at the head of line in the PDCP transmission buffer. This procedure needs to re-process the pre-constructed PDCP PDUs because the PDCP headers have to be updated with the new PDCP SNs. Moreover, re-encryption for the packets assigned with new SN numbers is required since the encryption algorithm depends on the PDCP COUNT which is determined in part by the PDCP SN. Thus, re-numbering and re-encryption of previously constructed PDCP PDUs are required for TCP ACK prioritization. This will cause delay and performance degradation on packet transmission and may be become serious in high data rate transmission.

At the receiver side, the PDCP PDUs containing the TCP ACK will be reordered at the radio link control (RLC) layer and also the PDCP layer for dual connectivity scenarios. In order to mitigate the delay caused by reordering, the PDCP entity may have to identify which PDCP PDUs contain the TCP ACKs and deliver those PDCP PDUs to the internet protocol (IP) stack expeditiously. However, this kind of processing is not modelled in the LTE PDCP specifications, may require additional packet inspection and may not be feasible in an event that the IP security is enabled. Based on the above considerations, it appears that the LTE PDCP design is not suitable for TCP ACK prioritization.

Figure 2:
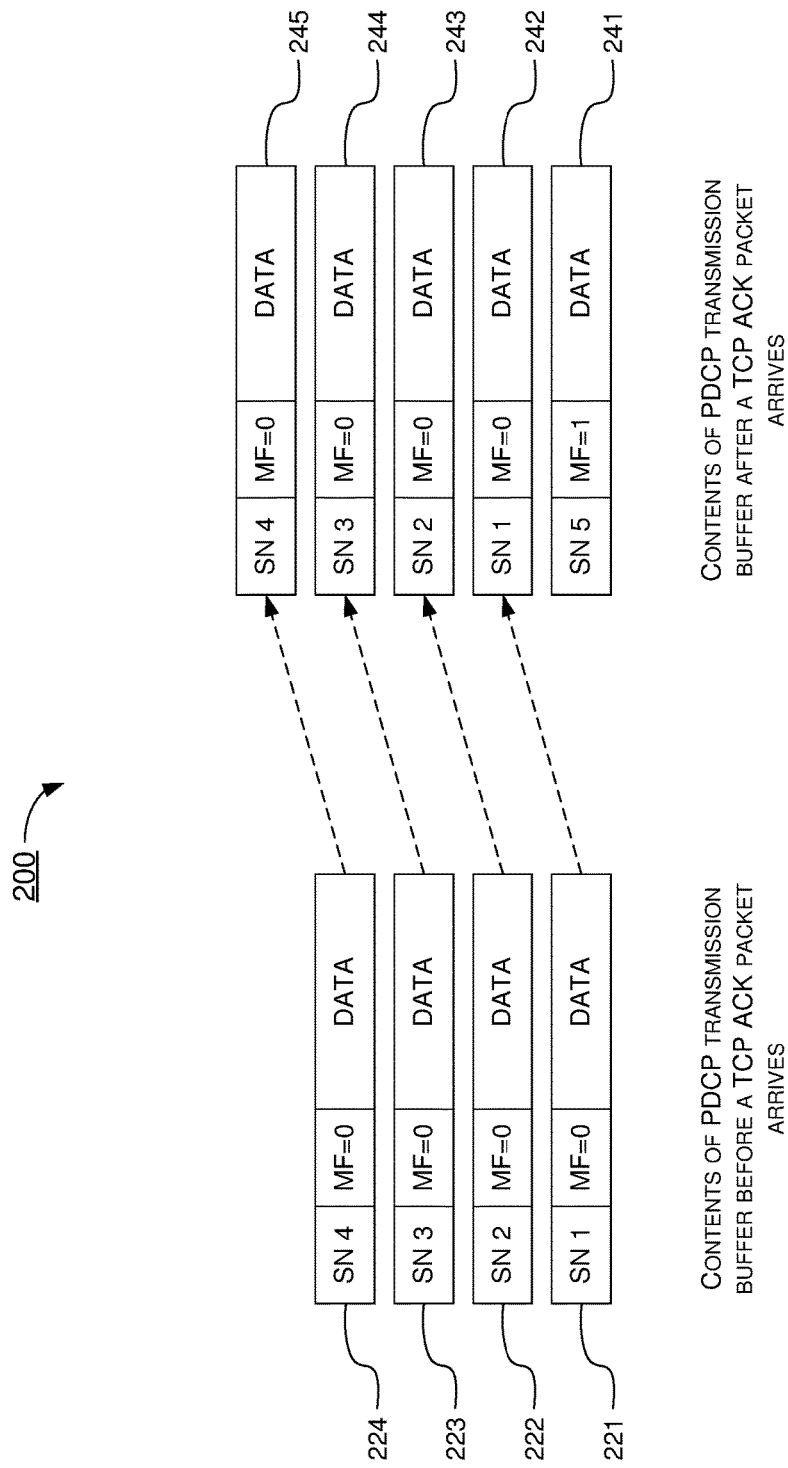
FIG. 2 is a diagram depicting an example scenario under schemes in accordance with implementations of the present disclosure.

FIG. 2 illustrates an example scenario 200 under schemes in accordance with implementations of the present disclosure. Scenario 200 involves a user equipment (UE) and a network apparatus, which may be a part of a wireless network (e.g., a LTE network, a LTE-Advanced network, a LTE-Advanced Pro network, a 5th Generation (5G) network, a New Radio (NR) network or an Internet of Things (IoT) network). For uplink transmission, the UE is the transmitter and the network apparatus is the receiver. For downlink transmission, the network apparatus is the transmitter and the UE is the receiver. FIG. 2 illustrates the PDCP architecture in accordance with implementations of the present disclosure. At the transmitter side, the transmitter may be configured to maintain a transmission buffer for buffering PDUs need to be transmitted. When new data packets come, the transmitter may be configured to determine whether specific information (e.g., ACK) is comprised in a PDU. The transmitter may be configured to mark the PDU whether the specific information is comprised in the PDU. The specific information can be any information that needs to be transmitted first such as, for example and without limitation, an ACK or any control information. As showed in left side of FIG. 2, the PDCP transmission buffer may comprise 4 PDCP PDUs 221-224 with the SN from SN 1 to SN 4. The first constructed PDCP PDU 221 is assigned the oldest SN with SN 1. The last constructed PDCP PDU 224 is assigned the newest SN with SN 4. The transmitter may be configured to mark whether a PDU contains an ACK by using a 1-bit flag in a header of the PDU. For example, the 1-bit flag may be indicated as "MF" (Marking Flag) in the header field of each PDU in FIG. 2. Since the PDCP PDUs 221-224 do not contain any ACKs, the 1-bit flag of each PDCP PDU may be indicated by MF=0.

When the transmitter determine that the specific information is comprised in a PDU, the transmitter may be configured to set the marking flag of the PDU containing the specific information. For example, as showed in right side of FIG. 2, PDCP PDU 241 is the PDCP PDU containing the TCP ACK. The transmitter may be configured to change the marking flag by MF=1. The transmitter may be further configured to prioritize the marked PDU (PDCP PDU 241) by inserting the PDU at the head of line in the PDCP transmission buffer. Then, the transmitter may be configured to prior deliver the marked PDU to a next protocol layer (e.g., RLC layer).

It should be noted that, with the PDU marking mechanism, there is no need to change the SN of the PDUs that have been constructed prior to constructing the PDU containing the ACK since the transmission procedure may be enhanced to ensure that the marked PDU can be transmitted first. For example, as showed in right side of FIG. 2, PDCP PDU 241 containing the ACK is constructed and assigned with a newest SN (e.g., SN 5). With the PDU marking mechanism, PDCP PDU 241 can be prioritized and inserted at the head of line in the PDCP transmission buffer. The SNs of the pre-constructed PDCP PDUs 242-245 are not changed after PDCP PDU 241 is constructed and inserted at the head of line in the PDCP transmission buffer. Accordingly, there is no need to perform re-numbering and re-encryption for previously constructed PDUs.

At the receiver side, after receiving the marked PDU, the receiver is able to determine that the marked PDU contains the ACK. The receiver may be configured to decipher and deliver the marked PDU to a higher protocol layer out-of-order. For example, the PDCP entity at the receiver does not need to reorder the marked PDUs (e.g., PDCP PDUs) and may directly deliver the marked PDUs to a higher protocol layer (e.g., RRC layer) out-of-order. Moreover, there is no need to perform packet inspection at the receiver since the PDU containing the ACK is marked by marking flag.

In some implementations, the aforementioned marking mechanism may also be employed in any scenario where out-of-order delivery of PDCP PDUs to higher layers is desirable. For example, in the ultra-reliable low latency communication (URLLC) scenario, the marking mechanism may be beneficial in an event that individual PDCP PDU contains atomic data which does not depend on other PDCP PDUs for high layers processing.

In some implementations, there are several ways to configure how the transmitter marks PDUs as described above. For example, the network apparatus may configure the UE via RRC messaging what kind of packets can be marked. The UE may be configured to receive a RRC message and determine a kind of packet to be marked according to the RRC message. The kinds of packet may be based on application types or header fields such as, for example and without limitation, Hypertext Transfer Protocol (HTTP), Transmission Control Protocol (TCP), User Datagram Protocol (UDP), Real-time Transport Protocol (RTP) or Internet Protocol (IP). In another implementation, the UE may autonomously determine which PDU can be marked.

In some implementations, the transmitter may be configured to use one or more bits to indicate "marking" by including these bits in the PDCP layer. For example, the transmitter may use more than one bits in the PDCP header filed to mark the PDCP PDU containing the ACK. Alternatively, the transmitter may use one or more bits in any PDCP fields to mark the PDCP PDU containing the ACK.

In some implementations, the transmitter and/or the receiver may be configured to maintain separate queues for the marked PDUs and unmarked PDUs. For example, the transmitter and/or the receiver may maintain a first queue for the marked PDUs and maintain a second queue for the unmarked PDUs.

In some implementations, the receiver may be configured to perform reordering for the received PDUs. For example, the receiver may be configured to reorder the marked PDUs in an event that more than one marked PDUs are received or the marked PDUs contains additional data packets need to be reordered. The receiver may be configured to maintain a first queue for queuing the marked PDUs and deliver the marked PDUs to a higher layer in order. The receiver may further be configured to maintain a second queue for queuing the unmarked PDUs and deliver the unmarked PDUs to a higher layer in order. In some implementations, the receiver may be configured to receive a RRC message and determine whether to re-order the marked PDU according to the RRC message.

In some implementations, in order to reduce delay, the receiver may be configured not to reorder the marked PDUs and deliver the marked PDUs immediately to the higher layers. The network apparatus may configure the UE which PDUs can be delivered without reordering based on, for example and without limitation, data radio bearer (DRB), value of "mark" or other packet headers.

In some implementations, the transmitter may be configured to assign different SN spaces for the marked PDUs and unmarked PDUs. For example, the transmitter may assign a first SN space for the marked PDUs and assign a second SN space for the unmarked PDUs.

In some implementations, the transmitter and/or the receiver may be configured to use a common SN space for both the marked PDUs and the unmarked PDUs. The common SN space may further comprise one or more marks. The PDCP header may be provided with additional fields such as, for example and without limitation, number of missing PDCP PDUs, SN of previously transmitted PDCP PDU with the same mark or SN of next transmitted PDCP PDU with the same mark to enable the receiver to chain together the consecutive PDUs belonging to the same mark.

Illustrative Implementations

Figure 3:
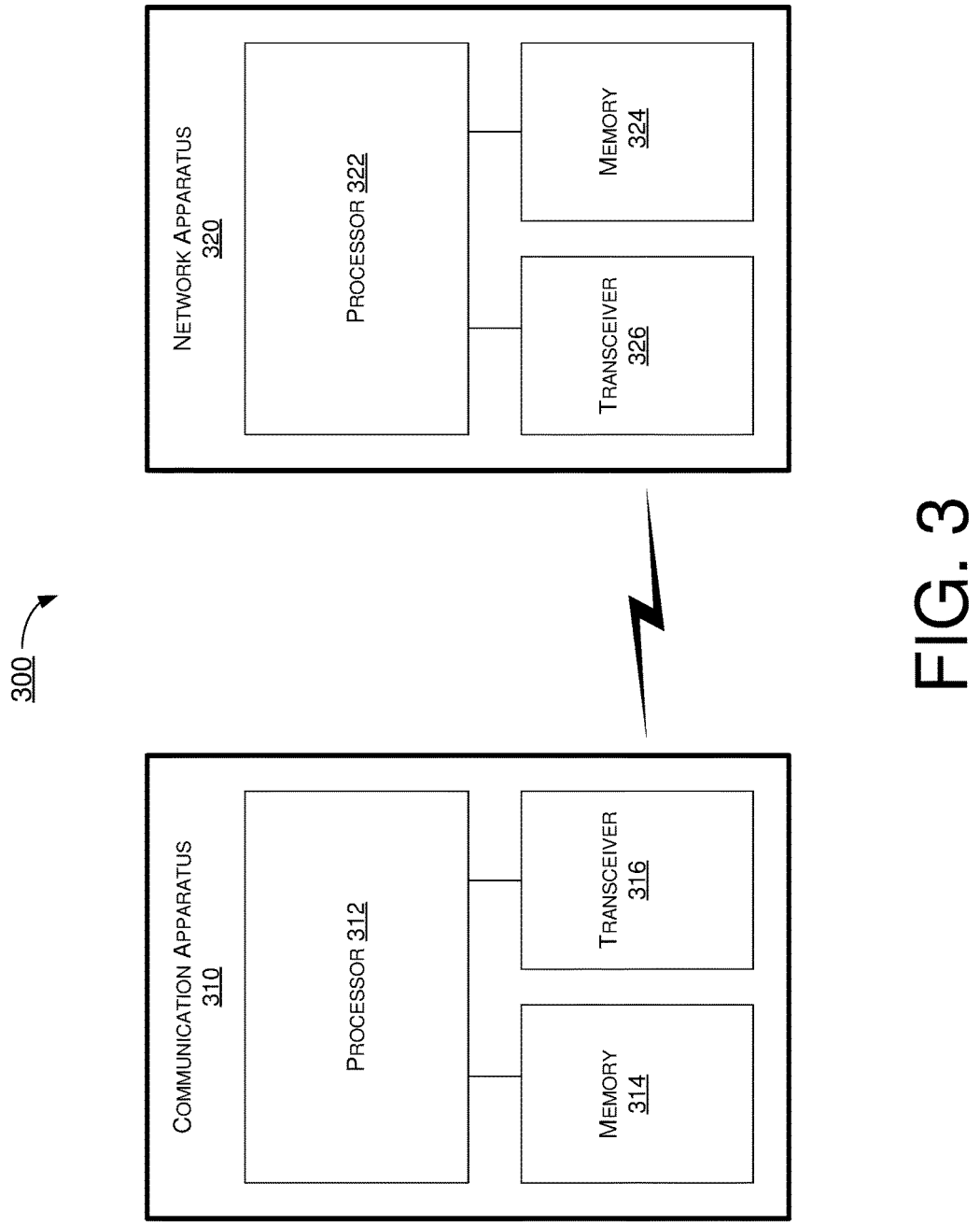
FIG. 3 is a block diagram of an example communication apparatus and an example network apparatus in accordance with an implementation of the present disclosure.

FIG. 3 illustrates an example communication apparatus 310 and an example network apparatus 320 in accordance with an implementation of the present disclosure. Each of communication apparatus 310 and network apparatus 320 may perform various functions to implement schemes, techniques, processes and methods described herein pertaining to data transmission enhancements with respect to user equipment and network apparatus in wireless communications, including scenarios 100 and 200 described above as well as processes 400 and 500 described below.

Communication apparatus 310 may be a part of an electronic apparatus, which may be a user equipment (UE) such as a portable or mobile apparatus, a wearable apparatus, a wireless communication apparatus or a computing apparatus. For instance, communication apparatus 310 may be implemented in a smartphone, a smartwatch, a personal digital assistant, a digital camera, or a computing equipment such as a tablet computer, a laptop computer or a notebook computer. Communication apparatus 310 may also be a part of a machine type apparatus, which may be an IoT apparatus such as an immobile or a stationary apparatus, a home apparatus, a wire communication apparatus or a computing apparatus. For instance, communication apparatus 310 may be implemented in a smart thermostat, a smart fridge, a smart doorlock, a wireless speaker or a home control center. Alternatively, communication apparatus 310 may be implemented in the form of one or more integrated-circuit (IC) chips such as, for example and without limitation, one or more single-core processors, one or more multi-core processors, or one or more complex-instruction-set-computing (CISC) processors. Communication apparatus 310 may include at least some of those components shown in FIG. 3 such as a processor 312, for example. Communication apparatus 310 may further include one or more other components not pertinent to the proposed scheme of the present disclosure (e.g., internal power supply, display device and/or user interface device), and, thus, such component(s) of communication apparatus 310 are neither shown in FIG. 3 nor described below in the interest of simplicity and brevity.

Network apparatus 320 may be a part of an electronic apparatus, which may be a network node such as a base station, a small cell, a router or a gateway. For instance, network apparatus 320 may be implemented in an eNodeB in a LTE, LTE-Advanced or LTE-Advanced Pro network or in a gNB in a 5G, NR or IoT network. Alternatively, network apparatus 320 may be implemented in the form of one or more IC chips such as, for example and without limitation, one or more single-core processors, one or more multi-core processors, or one or more CISC processors. Network apparatus 320 may include at least some of those components shown in FIG. 3 such as a processor 322, for example. Network apparatus 320 may further include one or more other components not pertinent to the proposed scheme of the present disclosure (e.g., internal power supply, display device and/or user interface device), and, thus, such component(s) of network apparatus 320 are neither shown in FIG. 3 nor described below in the interest of simplicity and brevity.

In one aspect, each of processor 312 and processor 322 may be implemented in the form of one or more single-core processors, one or more multi-core processors, or one or more CISC processors. That is, even though a singular term "a processor" is used herein to refer to processor 312 and processor 322, each of processor 312 and processor 322 may include multiple processors in some implementations and a single processor in other implementations in accordance with the present disclosure. In another aspect, each of processor 312 and processor 322 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 312 and processor 322 is a special-purpose machine specifically designed, arranged and configured to perform specific tasks including power consumption reduction in a device (e.g., as represented by communication apparatus 310) and a network (e.g., as represented by network apparatus 320) in accordance with various implementations of the present disclosure.

In some implementations, communication apparatus 310 may also include a transceiver 316 coupled to processor 312 and capable of wirelessly transmitting and receiving data. In some implementations, communication apparatus 310 may further include a memory 314 coupled to processor 312 and capable of being accessed by processor 312 and storing data therein. In some implementations, network apparatus 320 may also include a transceiver 326 coupled to processor 322 and capable of wirelessly transmitting and receiving data. In some implementations, network apparatus 320 may further include a memory 324 coupled to processor 322 and capable of being accessed by processor 322 and storing data therein. Accordingly, communication apparatus 310 and network apparatus 320 may wirelessly communicate with each other via transceiver 316 and transceiver 326, respectively. To aid better understanding, the following description of the operations, functionalities and capabilities of each of communication apparatus 310 and network apparatus 320 is provided in the context of a mobile communication environment in which communication apparatus 310 is implemented in or as a communication apparatus or a UE and network apparatus 320 is implemented in or as a network node of a communication network.

The following description pertains to the operations, functionalities and capabilities of communication apparatus 310. For uplink transmission, communication apparatus 310 is the transmitter. For downlink transmission, communication apparatus 310 is the receiver.

In some implementations, processor 312 may be configured to maintain a transmission buffer for buffering PDUs need to be transmitted. When new data packets come, processor 312 may be configured to determine whether specific information (e.g., ACK) is comprised in a PDU. Processor 312 may be configured to mark the PDU whether the specific information is comprised in the PDU. Processor 312 may be configured to mark whether a PDU contains the specific information by using a 1-bit flag in a header of the PDU. For example, processor 312 may use the 1-bit flag as "MF" (Marking Flag) in the header field of each PDU. For the PDCP PDUs do not contain any ACKs, processor 312 may set the 1-bit flag of each PDCP PDU as MF=0.

In some implementations, when processor 312 determine that an ACK is comprised in a PDU, processor 312 may be configured to set the marking flag of the PDU containing the ACK. For example, processor 312 may be configured to change the marking flag by MF=1 for the PDCP PDU containing the ACK. Processor 312 may be further configured to prioritize the marked PDU by inserting the PDU at the head of line in the PDCP transmission buffer. Then, processor 312 may be configured to prior deliver the marked PDU to a next protocol layer (e.g., RLC layer).

In some implementations, with the PDU marking mechanism, processor 312 does not need to change the SN of the PDUs that have been constructed prior to constructing the PDU containing the ACK. For example, processor 312 may construct and assign a newest SN for the PDCP PDU containing the ACK. With the PDU marking mechanism, processor 312 may prioritize and insert the PDCP PDU containing the ACK at the head of line in the PDCP transmission buffer. Processor 312 does not change the SNs of the pre-constructed PDCP PDUs after constructing and inserting the PDCP PDU containing the ACK at the head of line in the PDCP transmission buffer. Accordingly, processor 312 does not need to perform re-numbering and re-encryption for previously constructed PDUs.

In some implementations, after receiving the marked PDU, processor 312 is able to determine that the marked PDU contains the ACK. Processor 312 may be configured to decipher and deliver the marked PDU to a higher protocol layer out-of-order. For example, processor 312 does not need to reorder the marked PDUs (e.g., PDCP PDUs) and may directly deliver the marked PDUs to a higher protocol layer (e.g., RRC layer) out-of-order. Moreover, processor 312 does not need to perform packet inspection since the PDU containing the ACK is marked by marking flag.

In some implementations, there are several ways to configure how processor 312 marks PDUs as described above. For example, network apparatus 320 may configure communication apparatus 310 via RRC messaging what kind of packets can be marked. Processor 312 may be configured to receive a RRC message and determine a kind of packet to be marked according to the RRC message. The kinds of packet may be based on application types or header fields such as, for example and without limitation, Hypertext Transfer Protocol (HTTP). Transmission Control Protocol (TCP), User Datagram Protocol (UDP), Real-time Transport Protocol (RTP) or Internet Protocol (IP). In another implementation, processor 312 may autonomously determine which PDU can be marked.

In some implementations, processor 312 may be configured to use one or more bits to indicate "marking" by including these bits in the PDCP layer. For example, processor 312 may use more than one bits in the PDCP header filed to mark the PDCP PDU containing the ACK. Alternatively, processor 312 may use one or more bits in any PDCP fields to mark the PDCP PDU containing the ACK.

In some implementations, processor 312 may be configured to maintain separate queues for the marked PDUs and unmarked PDUs. For example, processor 312 may maintain a first queue for the marked PDUs and maintain a second queue for the unmarked PDUs.

In some implementations, processor 312 may be configured to perform reordering for the received PDUs. For example, processor 312 may be configured to reorder the marked PDUs in an event that more than one marked PDUs are received or the marked PDUs contains additional data packets need to be reordered. Processor 312 may be configured to maintain a first queue for queuing the marked PDUs and deliver the marked PDUs to a higher layer in order. Processor 312 may further be configured to maintain a second queue for queuing the unmarked PDUs and deliver the unmarked PDUs to a higher layer in order. In some implementations, processor 312 may be configured to receive a RRC message and determine whether to re-order the marked PDU according to the RRC message.

In some implementations, in order to reduce delay, processor 312 may be configured not to reorder the marked PDUs and deliver the marked PDUs immediately to the higher layers. Network apparatus 320 may configure communication apparatus 310 which PDUs can be delivered without reordering based on, for example and without limitation, data radio bearer (DRB), value of "mark" or other packet headers.

In some implementations, processor 312 may be configured to assign different SN spaces for the marked PDUs and unmarked PDUs. For example, processor 312 may assign a first SN space for the marked PDUs and assign a second SN space for the unmarked PDUs.

In some implementations, processor 312 may be configured to use a common SN space for both the marked PDUs and the unmarked PDUs. The common SN space may further comprise one or more marks. The PDCP header may be provided with additional fields such as, for example and without limitation, number of missing PDCP PDUs, SN of previously transmitted PDCP PDU with the same mark or SN of next transmitted PDCP PDU with the same mark to enable processor 312 to chain together the consecutive PDUs belonging to the same mark.

The following description pertains to the operations, functionalities and capabilities of network apparatus 320. For uplink transmission, network apparatus 320 is the receiver. For downlink transmission, network apparatus 320 is the transmitter.

In some implementations, processor 322 may be configured to maintain a transmission buffer for buffering PDUs need to be transmitted. When new data packets come, processor 322 may be configured to determine whether specific information (e.g., ACK) is comprised in a PDU. Processor 322 may be configured to mark the PDU whether the specific information is comprised in the PDU. Processor 322 may be configured to mark whether a PDU contains the specific information by using a 1-bit flag in a header of the PDU. For example, processor 322 may use the 1-bit flag as "MF" (Marking Flag) in the header field of each PDU. For the PDCP PDUs do not contain any ACKs, processor 322 may set the 1-bit flag of each PDCP PDU as MF=0.

In some implementations, when processor 322r determine that an ACK is comprised in a PDU, processor 322 may be configured to set the marking flag of the PDU containing the ACK. For example, processor 322 may be configured to change the marking flag by MF=1 for the PDCP PDU containing the ACK. Processor 322 may be further configured to prioritize the marked PDU by inserting the PDU at the head of line in the PDCP transmission buffer. Then, processor 322 may be configured to prior deliver the marked PDU to a next protocol layer (e.g., RLC layer).

In some implementations, with the PDU marking mechanism, processor 322 does not need to change the SN of the PDUs that have been constructed prior to constructing the PDU containing the ACK. For example, processor 322 may construct and assign a newest SN for the PDCP PDU containing the ACK. With the PDU marking mechanism, processor 322 may prioritize and insert the PDCP PDU containing the ACK at the head of line in the PDCP transmission buffer. Processor 322 does not change the SNs of the pre-constructed PDCP PDUs after constructing and inserting the PDCP PDU containing the ACK at the head of line in the PDCP transmission buffer. Accordingly, processor 322 does not need to perform re-numbering and re-encryption for previously constructed PDUs.

In some implementations, after receiving the marked PDU, processor 322 is able to determine that the marked PDU contains the ACK. Processor 322 may be configured to decipher and deliver the marked PDU to a higher protocol layer out-of-order. For example, processor 322 does not need to reorder the marked PDUs (e.g., PDCP PDUs) and may directly deliver the marked PDUs to a higher protocol layer (e.g., RRC layer) out-of-order. Moreover, processor 322 does not need to perform packet inspection since the PDU containing the ACK is marked by marking flag.

In some implementations, network apparatus 320 may configure communication apparatus 310 via RRC messaging what kind of packets can be marked. Processor 322 may be configured to configure a kind of packet to be marked and transmit a RRC message to communication apparatus 31. The kinds of packet may be based on application types or header fields such as, for example and without limitation, Hypertext Transfer Protocol (HTTP), Transmission Control Protocol (TCP), User Datagram Protocol (UDP), Real-time Transport Protocol (RTP) or Internet Protocol (IP).

In some implementations, processor 322 may be configured to use one or more bits to indicate "marking" by including these bits in the PDCP layer. For example, processor 322 may use more than one bits in the PDCP header filed to mark the PDCP PDU containing the ACK. Alternatively, processor 322 may use one or more bits in any PDCP fields to mark the PDCP PDU containing the ACK.

In some implementations, processor 322 may be configured to maintain separate queues for the marked PDUs and unmarked PDUs. For example, processor 322 may maintain a first queue for the marked PDUs and maintain a second queue for the unmarked PDUs.

In some implementations, processor 322 may be configured to perform reordering for the received PDUs. For example, processor 322 may be configured to reorder the marked PDUs in an event that more than one marked PDUs are received or the marked PDUs contains additional data packets need to be reordered. Processor 322 may be configured to maintain a first queue for queuing the marked PDUs and deliver the marked PDUs to a higher layer in order. Processor 322 may further be configured to maintain a second queue for queuing the unmarked PDUs and deliver the unmarked PDUs to a higher layer in order. In some implementations, processor 322 may be configured to receive a RRC message and determine whether to re-order the marked PDU according to the RRC message.

In some implementations, in order to reduce delay, processor 322 may be configured not to reorder the marked PDUs and deliver the marked PDUs immediately to the higher layers. Network apparatus 320 may configure communication apparatus 310 which PDUs can be delivered without reordering based on, for example and without limitation, data radio bearer (DRB), value of "mark" or other packet headers.

In some implementations, processor 322 may be configured to assign different SN spaces for the marked PDUs and unmarked PDUs. For example, processor 322 may assign a first SN space for the marked PDUs and assign a second SN space for the unmarked PDUs.

In some implementations, processor 322 may be configured to use a common SN space for both the marked PDUs and the unmarked PDUs. The common SN space may further comprise one or more marks. The PDCP header may be provided with additional fields such as, for example and without limitation, number of missing PDCP PDUs, SN of previously transmitted PDCP PDU with the same mark or SN of next transmitted PDCP PDU with the same mark to enable processor 322 to chain together the consecutive PDUs belonging to the same mark.

Illustrative Processes

Figure 4:
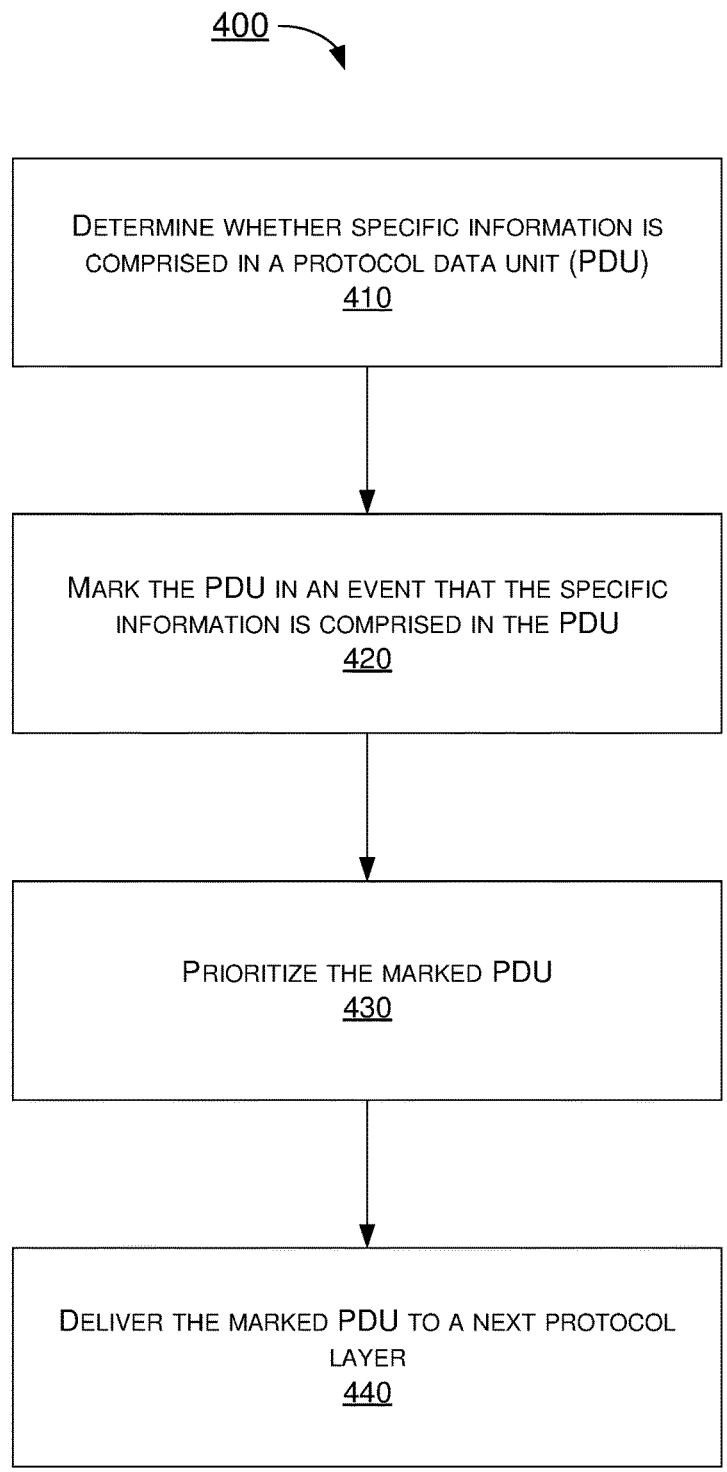
FIG. 4 is a flowchart of an example process in accordance with an implementation of the present disclosure.

FIG. 4 illustrates an example process 400 in accordance with an implementation of the present disclosure. Process 400 may be an example implementation of scenario 200, whether partially or completely, with respect to data transmission enhancements in accordance with the present disclosure. Process 400 may represent an aspect of implementation of features of communication apparatus 310. Process 400 may include one or more operations, actions, or functions as illustrated by one or more of blocks 410, 420, 430 and 440. Although illustrated as discrete blocks, various blocks of process 400 may be divided into additional blocks, combined into fewer blocks, or eliminated, depending on the desired implementation. Moreover, the blocks of process 400 may executed in the order shown in FIG. 4 or, alternatively, in a different order. Process 400 may be implemented by communication apparatus 310 or any suitable UE or machine type devices. Solely for illustrative purposes and without limitation, process 400 is described below in the context of communication apparatus 310. Process 400 may begin at block 410.

At 410, process 400 may involve communication apparatus 310 determining whether specific information is comprised in a protocol data unit (PDU). Process 400 may proceed from 410 to 420.

At 420, process 400 may involve communication apparatus 310 marking the PDU in an event that the specific information is comprised in the PDU. Process 400 may proceed from 420 to 430.

At 430, process 400 may involve communication apparatus 310 prioritizing the marked PDU. Process 400 may proceed from 430 to 440.

At 440, process 400 may involve communication apparatus 310 delivering the marked PDU to a next protocol layer.

In some implementations, the PDU is a packet data convergence protocol (PDCP) PDU. The specific information is a transmission control protocol (TCP) acknowledgement (ACK). Communication apparatus 310 may mark the PDU by using a 1-bit flag in a header of the PDU. A sequence number (SN) of an unmarked PDU is not changed.

In some implementations, process 400 may further involve communication apparatus 310 receiving a radio resource control (RRC) message and determining a kind of packet to be marked according to the RRC message.

In some implementations, process 400 may further involve communication apparatus 310 maintaining a first queue for the marked PDU and maintaining a second queue for unmarked PDUs.

In some implementations, process 400 may further involve communication apparatus 310 assigning, a first SN space for the marked PDU and assigning a second SN space for unmarked PDUs.

In some implementations, process 400 may further involve communication apparatus 310 assigning a common SN space for the marked PDU and unmarked PDUs.

Figure 5:
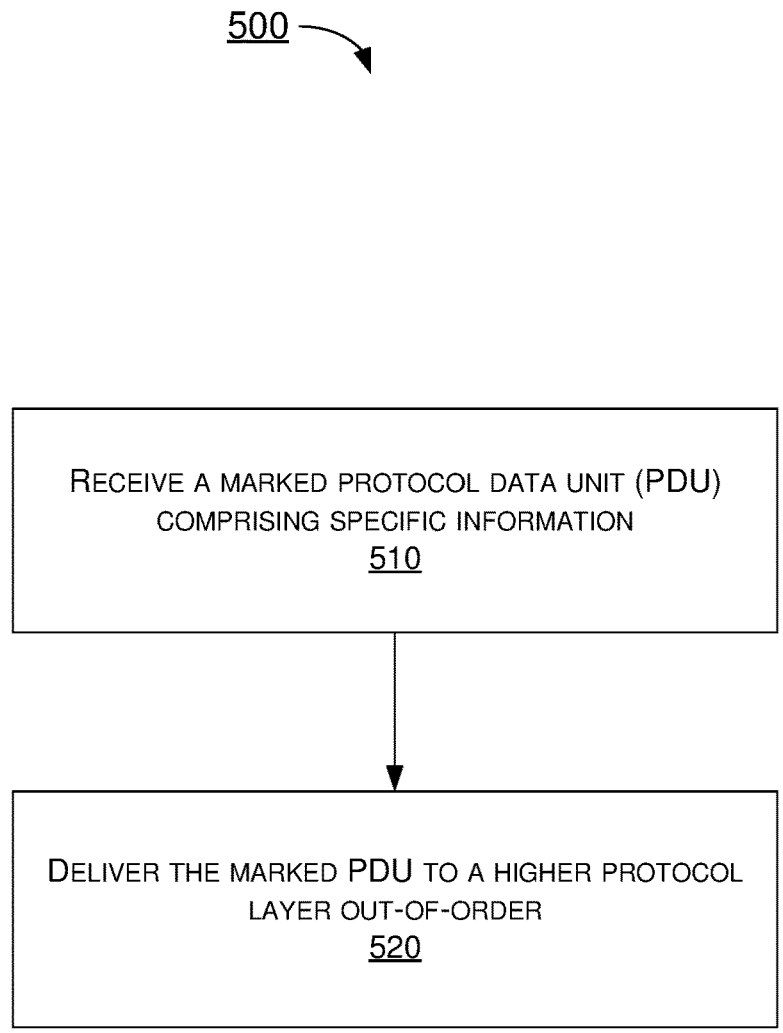
FIG. 5 is a flowchart of an example process in accordance with an implementation of the present disclosure.

FIG. 5 illustrates an example process 500 in accordance with an implementation of the present disclosure. Process 500 may be an example implementation of scenario 200, whether partially or completely, with respect to data transmission enhancements in accordance with the present disclosure. Process 500 may represent an aspect of implementation of features of communication apparatus 310. Process 500 may include one or more operations, actions, or functions as illustrated by one or more of blocks 510 and 520. Although illustrated as discrete blocks, various blocks of process 500 may be divided into additional blocks, combined into fewer blocks, or eliminated, depending on the desired implementation. Moreover, the blocks of process 500 may executed in the order shown in FIG. 5 or, alternatively, in a different order. Process 500 may be implemented by communication apparatus 310 or any suitable UE or machine type devices. Solely for illustrative purposes and without limitation, process 500 is described below in the context of communication apparatus 310. Process 500 may begin at block 510.

At 510, process 500 may involve communication apparatus 310 receiving a marked protocol data unit (PDU) comprising specific information. Process 500 may proceed from 510 to 520.

At 520, process 500 may involve communication apparatus 310 delivering the marked PDU to a higher protocol layer out-of-order.

In some implementations, the PDU is a packet data convergence protocol (PDCP) PDU. The marked PDU comprises a 1-bit flag in a header of the marked PDU. The specific information is a transmission control protocol (TCP)

acknowledgement (ACK). Communication apparatus 310 may deliver the marked PDU without re-ordering.

In some implementations, process 500 may further involve communication apparatus 310 receiving a radio resource control (RRC) message and determining a kind of packet can be delivered without re-ordering according to the RRC message.

In some implementations, process 500 may further involve communication apparatus 310 receiving a radio resource control (RRC) message and determining whether to re-order the marked PDU according to the RRC message.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method of enhancements in data transmission, comprising:
   determining, by a processor of an apparatus, whether specific information is comprised in a protocol data unit (PDU) of a plurality of PDUs in a queue;
   marking, by the processor of the apparatus, the PDU in an event that the specific information is comprised in the PDU;
   prioritizing, by the processor of the apparatus, the marked PDU by placing the marked PDU at a head of the queue so that the marked PDU is transmitted before one or more unmarked PDUs in the queue even though a sequence number associated with the marked PDU is later in order than a sequence number associated with at least one of the one or more unmarked PDUs;
   delivering, by the processor of the apparatus, the marked PDU to a next protocol layer first; and
   delivering, by the processor of the apparatus, the one or more unmarked PDUs to a higher layer.

2. The method of claim 1, wherein the PDU is a packet data convergence protocol (PDCP) PDU.

3. The method of claim 1, wherein the processor marks the PDU by using a 1-bit flag in a header of the PDU.

4. The method of claim 1, wherein a sequence number (SN) of an unmarked PDU is not changed.

5. The method of claim 1, wherein the specific information is a transmission control protocol (TCP) acknowledgement (ACK).

6. The method of claim 1, further comprising:
   receiving, by the processor, a radio resource control (RRC) message; and determining, by the processor, a kind of packet to be marked according to the RRC message.

7. The method of claim 1, further comprising:
maintaining, by the processor, a first queue for the marked PDU; and
maintaining, by the processor, a second queue for unmarked PDUs.

8. The method of claim 1, further comprising:
assigning, by the processor, a first SN space for the marked PDU; and
assigning, by the processor, a second SN space for unmarked PDUs.

9. The method of claim 1, further comprising:
assigning, by the processor, a common SN space for the marked PDU and unmarked PDUs.

10. A method of enhancements in data transmission, comprising:
receiving, by a processor of an apparatus, a marked protocol data unit (PDU) and at least one unmarked PDU;
delivering, by the processor of the apparatus, the marked PDU to a higher protocol layer out-of-order such that the marked PDU is delivered before the unmarked PDU even though a sequence number associated with the marked PDU is later in order than a sequence number associated with the at least one unmarked PDU; and
delivering, by the processor of the apparatus, the at least one unmarked PDU to a higher layer,
wherein the marked PDU comprises specific information.

11. The method of claim 10, wherein the PDU is a packet data convergence protocol (PDCP) PDU.

12. The method of claim 10, wherein the marked PDU comprises a 1-bit flag in a header of the marked PDU.

13. The method of claim 10, wherein the specific information is a transmission control protocol (TCP) acknowledgement (ACK).

14. The method of claim 10, wherein the processor delivers the marked PDU without re-ordering.

15. The method of claim 10, further comprising:
receiving, by the processor, a radio resource control (RRC) message; and
determining, by the processor, a kind of packet can be delivered without re-ordering according to the RRC message.

16. The method of claim 10, further comprising:
receiving, by the processor, a radio resource control (RRC) message; and
determining, by the processor, whether to re-order the marked PDU according to the RRC message.

* * * * *